B. C. HOYT.
Improvement in Riding-Plows.
No. 115,057.
Patented May 23, 1871.
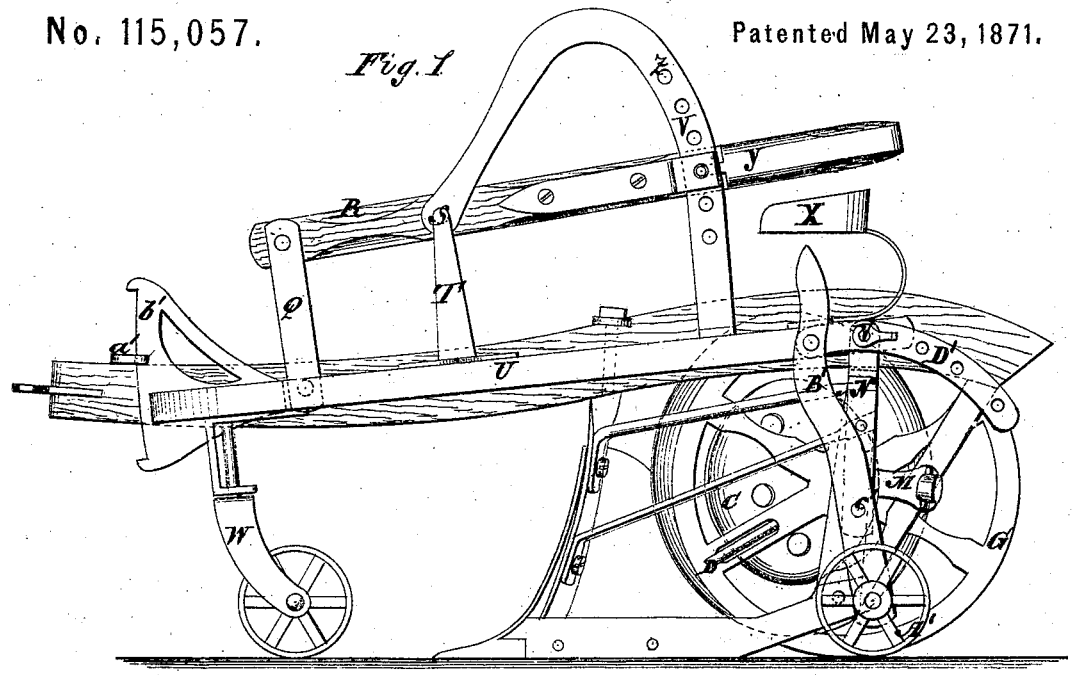
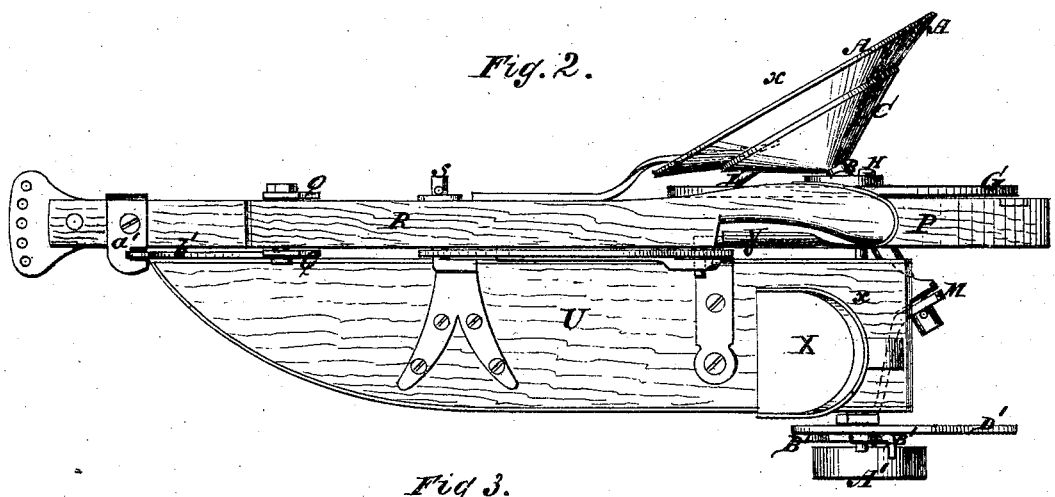
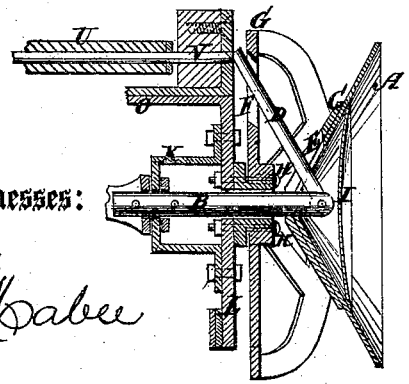
Witnesses:
E. Wolff
L. S. Habee
Inventor:
B. C. Hoyt
per
Attorneys.

UNITED STATES PATENT OFFICE.

BENAIAH C. HOYT, OF FORT ATKINSON, WISCONSIN.

IMPROVEMENT IN RIDING-PLOWS.

Specification forming part of Letters Patent No. 115,057, dated May 23, 1871.

*To all whom it may concern:*

Be it known that I, BENAIAH C. HOYT, of Fort Atkinson, in the county of Jefferson and State of Wisconsin, have invented new and useful Improvement in Riding-Plows; and I do hereby declare that the following is a full, clear, and exact description thereof, which will enable others skilled in the art to make and use the same, reference being had to the accompanying drawing forming part of this specification.

My invention relates to improvements upon the plow patented to me September 2, 1856.

It consists, first, in the use of a single pivoted lever with the disk and wheel; and, secondly, in the improved mode of combining the bracket, hub, and shaft.

Figure 1 is a side elevation of my improved plow; Fig. 2 is a plan view; and Fig. 3 is a section of Fig. 2.

Similar letters of reference indicate corresponding parts.

A is a concave disk of sheet metal, arranged to turn in a vertical or nearly-vertical plane, parallel with the general course of the moldboard, which is made shorter than those not having the disk. Hitherto the disks of this character which have been used have been mounted loosely on a fixed pivot, which, being greatly exposed to wear by gravel, sand, and the like working into the eye of the disk, soon becomes worn out. I therefore propose to key this disk on a short shaft, B, to turn with it, and for making a strong and durable attachment I provide a broad concave or cup-shaped collar, C, of cast metal, for seating the disk in and keying to the shaft with it. For imparting the motion to the disk, which works in a plane oblique to the turning wheels of the machine, I arrange the said disk at some distance back from the outer end of the shaft B, and pivot the lever D in the end so as to vibrate in the plane of the axis of shaft B. This lever extends through a slot, E, in the disk and collar, and also through a slot, F, in a truck-wheel, G, mounted on a large fixed stud, H, on the frame of the truck, and arranged to run in the furrow behind the plow. As the slot made through the disk for the lever D would allow the sand and gravel turned up by the plow to work through the bearings of the shaft B and the wheel G, I apply the disk I to the disk A, as shown, in front of the shaft, as a protection against it. The lever D is vertically pivoted to the end of a shaft, B, are ranged obliquely to the wheel G, and also passed through disk A and wheel G; hence, by the rotation of wheel G in the forward movement of the machine, the lever D is carried round, and compels the disk A to travel with it. Since, however, the wheel and disk travel in different planes, at an acute angle to each other, the lever D requires vertical play, which is provided for in the slots E and F. The hub H, on which wheel G is mounted, is made large enough to make room for an oblique bearing in it for the shaft B. The inner end of the said shaft is supported in a bracket, K, bolted to the part L of the frame, and braced by the brace M connected to the vertical bar N of the frame, connected to a bar, L, by the cross-piece O. The rear end of the plow-beam P is connected to this frame, and the front end is suspended by bars Q, from a strong lever, R, pivoted at S to a post, T, rising up from a platform, U, pivoted at V to the frame L N O, and supported at the front on a caster-wheel, W. Near the rear end of said lever, which ranges near the driver's seat X, it is held by a spring-pin, Y, at any required position along the vertical bar Z, rising up from the platform, by which the beam is raised or lowered to vary the depth of the furrow.

The truck-wheel A', which is used in connection with the wheel G to maintain the frame in the vertical position required, is made smaller than said wheel G, and mounted on the end of a lever, B', pivoted to the vertical bar N at C', so as to be raised or lowered by turning the lever which is connected to a curved bar, D', which is clamped to the frame by a bolt and nut at E', the said bar being provided with a number of holes for shifting from one position to another, according to the position it is required for the wheel A' to occupy relatively to the wheel G.

By this arrangement the machine may be readily adjusted either for running on the level ground, or when plowing for the wheel G to work in the furrow, and for varying the depth of the furrow, thereby always maintaining the frame and the plow in the proper vertical position.

The front end of the beam has a notched plate, $a'$, which works along the edge of the guide-plate $b'$, attached to the platform for keeping the two together laterally.

Having thus described my invention, I claim as new and desire to secure by Letters Patent—

1. The single pivoted lever D, slotted disk A, and wheel G, all combined as described, for the purpose specified.

2. The bracket K, hub H, and shaft B, all combined as described, for the purpose specified.

BENAIAH C. HOYT.

Witnesses:
GEO. C. SMITH,
WM. M. DANN.